US007414795B2

(12) United States Patent
Cok

(10) Patent No.: US 7,414,795 B2

(45) Date of Patent: Aug. 19, 2008

(54) METHOD FOR DRIVING DISPLAY WITH REDUCED AGING

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 290 days.

(21) Appl. No.: 11/383,323

(22) Filed: May 15, 2006

(65) Prior Publication Data

US 2007/0262709 A1 Nov. 15, 2007

(51) Int. Cl.

| | |
|---|---|
| ***G02B 9/00*** | (2006.01) |
| ***G09G 3/30*** | (2006.01) |
| ***G09G 5/10*** | (2006.01) |
| ***G06K 9/38*** | (2006.01) |
| ***G06K 9/40*** | (2006.01) |

(52) U.S. Cl. ........................ 359/649; 345/77; 345/690; 382/271; 382/274

(58) Field of Classification Search ......... 359/649–651; 345/77, 690; 382/271, 274

See application file for complete search history.

(56) References Cited

U.S. PATENT DOCUMENTS 6,313,878 B1 11/2001 Jankowiak
6,856,328 B2 2/2005 Holtslag
7,356,195 B2 * 4/2008 Shaked et al. ............... 382/260
2005/0246657 A1 11/2005 Widner
2006/0170662 A1 * 8/2006 Kurane ....................... 345/204
2007/0116377 A1 * 5/2007 Kondo et al. ................ 382/274
2008/0001973 A1 * 1/2008 Willis ......................... 345/690

* cited by examiner

*Primary Examiner*—Jordan M Schwartz

(74) *Attorney, Agent, or Firm*—Andrew J. Anderson

(57) ABSTRACT

A method of driving a display having a plurality of light-emitting elements that change with time or use, comprising the steps of: a) displaying first and second image signals having spatially distributed pixels divided into a plurality of groups, and forming first and second image signal group attributes for each of the plurality of groups; b) comparing the second group attributes and the first group attributes to form at least one group difference value for each group, comparing the group difference values to at least one predetermined metric to form at least one pixel group dynamic value, combining the group dynamic values, and if the combined group dynamic values are found to be less than a first limit, displaying a display-preserving image signal over the entire display.

20 Claims, 5 Drawing Sheets

METHOD FOR DRIVING DISPLAY WITH REDUCED AGING

FIELD OF THE INVENTION

The present invention relates to a method for driving display devices and more particularly to such a method for reducing differential aging of light-emitting elements of display devices.

BACKGROUND OF THE INVENTION

Displays comprising a plurality of light-emitting elements, and in particular solid-state organic light-emitting diode (OLED) image display devices, are of great interest as flat-panel display technology. These displays utilize current passing through thin films of organic material to generate light. The color of light emitted and the efficiency of the energy conversion from current to light are determined by the composition of the organic thin-film material. Different organic materials emit different colors of light. However, as the display is used, the light-emitting elements change with time or use, as the organic materials in the device age and become less efficient at emitting light. This reduces the lifetime of the display. The differing organic materials may age at different rates, causing differential color aging and a display whose white point varies as the display is used. If some light-emitting elements in the display are used more than other, spatially differentiated aging may result, causing portions of the display to be dimmer than other portions when driven with a similar signal. In particular, this may occur when the screen displays a single graphic element in one location for a long period time. Such graphic elements can include stripes or rectangles with background information, for example such as news headlines and sports scores, network logos, and the like. Differences in signal format are also problematic.

Computer monitors typically employ screen savers that are automatically displayed when no user interaction has been detected for a predetermined period of time. The screen savers may either blank the screen or employ a variable image signal to prevent excessive aging, in particular localized aging. However, for entertainment applications, user interaction may be infrequent and localized aging can become a problem for displays that are susceptible to this problem.

Television broadcasts may have a variety of signal variations, even when a static image is conveyed. For example, transmissions are subject to a variety of noise factors that can slightly change the signal. Any digitization of the analog signal may result in slight variations that result from these variations, as well as inherent noise in the digitization process. Moreover, a live broadcast of a static scene may have slight variations in camera location that will result in similar variability. Hence, two frames that are ostensibly identical, when processed within a consumer's television receiver, will have minor differences and a comparative method for detecting static images that relies on an identical match may fail inappropriately. In other cases, a scene may be largely static but have one small area that varies significantly. For example, a web page may have completely static content except for a clock or continuously updated text in one small area. Such a scene may also be problematic with respect to avoiding burn-in in a display. In yet another case, a single frame interruption of a static scene broadcast (for example with an intermittent electromagnetic interference in the broadcast system) may be incorrectly interpreted as a cessation of a static image broadcast. Likewise, horizontal or vertical sync variability may produce a similar, deleterious effect. Digital signals may have other problems with signal corruption, for example blocking errors or decompression faults, or a broadcast signal may be interrupted.

The general problem of regional brightness differences due to icon burn-in of specific areas due to video content has been addressed in the prior art, for example by U.S. Pat. No. 6,856,328 B2 entitled, "System and method of displaying images" Logos may be present in images transmitted by television stations. These logos are often present in the corners of an image for a long time. They do not move and may comprise saturated colors. This results in burn-in effects in emissive displays because the logos provide the same display load at the same location for a relatively long period of time. The burn-in effect can be prevented by detecting the logos in the corners of the image and reducing their intensity to the average display load. Alternatively, US20050246657 A1 entitled "Video display arrangement including image processing circuitry for protecting display and method of protecting a video display" describes a video display arrangement that includes a display and a receiver. The receiver includes video imaging processing circuitry, the circuitry including a video formatter adapted to transmit formatted active image signals, a display buffer having a video display memory for temporarily storing the active image signals and transferring the active image signals to a display, a comparator for comparing one or more blocks of the video display memory for changing content over time and sending a static content warning signal to the video formatter when content in the one or more blocks remains static beyond a predetermined static content period, and program storage including one or more programs adapted to cause the video formatter to transfer a changing content image to the display buffer after receiving the static content warning signal. However, this design requires the use of a frame-store to store images for comparison. Such frame stores, particularly for analog signals, are expensive. Moreover, the comparator is not robust in the face of minor and inconsequential signal changes and the use of content-changing signals to individual blocks may not be acceptable to users.

U.S. Pat. No. 6,313,878 B1 entitled "Method and structure for providing an automatic hardware-implemented screen-saver function to a display product" describes a hardware-implemented screen-saver that prevents burn-in of an image displayed on a screen of a display product by automatically reducing the video gain, and therefore the contrast, of the image when the portion of the image within a two-dimensional detection window has changed by less than a predetermined amount for a predetermined period of time. A lack of change of the incoming video signal of the image is detected and used to invoke a reduction in contrast of the image displayed on the display product. This allows the image to remain visible, yet reduces the possibility of burn-in of the image in the screen of the display product. This disclosure describes the use of voltage averaging circuits and checksums, thereby mitigating the need for a frame-store. It also describes the use of user-defined windows for selecting a portion of an image signal. However, this embodiment may require user interaction, be limited to a single sampling window, and fail to be robust in the presence of minor signal variations.

There is a need, therefore, for an improved method of detecting image signals that can cause localized burn-in for a display having a plurality of light-emitting elements having outputs that change with time or use.

SUMMARY OF THE INVENTION

In accordance with one embodiment, the invention is directed towards a method of driving a display having a plurality of light-emitting elements that change with time or use, comprising the steps of: a) displaying a first image signal having spatially distributed pixels divided into a plurality of groups, each pixel group comprising more than one spatially neighboring pixel, and forming and storing one or more first image signal group attributes for each of the plurality of pixel groups; b) displaying a subsequent second image signal having spatially distributed pixels divided into the plurality of groups and forming one or more subsequent second image signal group attributes for each of the plurality of pixel groups; and c) comparing the subsequent second group attributes and the stored first group attributes to form at least one group difference value for each pixel group, comparing the group difference values to at least one predetermined metric to form at least one pixel group dynamic value, combining the group dynamic values, and if the combined group dynamic values are found to be less than a first limit, displaying a display-preserving image signal over the entire display that is different from the first and second image signals, and if the combined group dynamic values are not found to be less than a first limit, storing the subsequent second image signal group attributes.

ADVANTAGES

The advantages of this invention include providing a display system that reduces aging of the display without requiring extensive or complex circuitry.

DETAILED DESCRIPTION OF THE INVENTION

Figure 1:
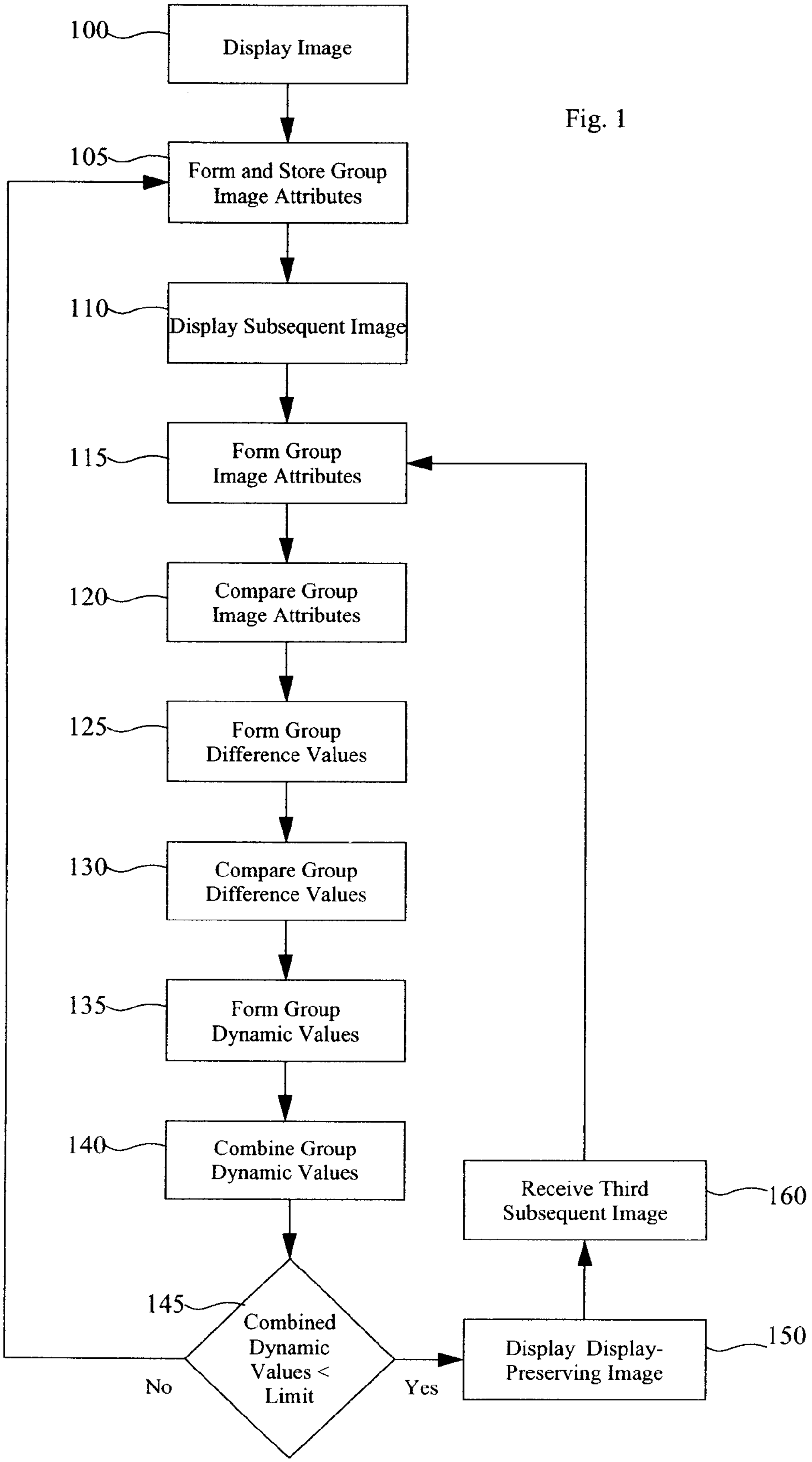
FIG. 1 is a flow diagram of the method according to one embodiment of the present invention.

Referring to FIG. 1, a method of driving a display having a plurality of light-emitting elements that change with time or use, comprises the steps of displaying 100 a first image signal having spatially distributed pixels divided into a plurality of groups, each pixel group comprising more than one spatially neighboring pixel, and forming and storing 105 one or more first image signal group attributes for each of the plurality of pixel groups; displaying 110 a subsequent second image signal having spatially distributed pixels divided into the plurality of groups and forming 115 one or more subsequent second image signal group attributes for each of the plurality of pixel groups; comparing 120 the subsequent second group attributes and the stored first group attributes to form 125 at least one group difference value for each pixel group, comparing 130 the group difference values to at least one predetermined metric to form 135 at least one pixel group dynamic value, combining 140 the group dynamic values, and if the combined group dynamic values are found 145 to be less than a first limit, displaying 150 a display-preserving image signal over the entire display that is different from the first and second image signals, and if the combined group dynamic values are not found 145 to be less than a first limit, storing 105 the subsequent second image signal group attributes.

The process of FIG. 1 provides a robust means to determine whether a static image series is received by comparing the group attributes of each group of the image signals to a metric, and then combining the information gained concerning each group to determine whether the image is sufficiently static to employ a display-preserving signal. Because different groups are individually judged, a more reliable overall judgment may be obtained. According to the present invention, while group difference values and dynamic values are formed for each pixel group, the display-preserving image signal is displayed on the entire screen, not just portions of the screen (for example corresponding to the groups), based on the combined group dynamic values. Such an approach is more effective at display preservation, power saving, and is more user friendly and comprehensible.

In a further embodiment of the present invention, a subsequent third image signal having spatially distributed pixels divided into the plurality of groups is received 160 while displaying the display-preserving image signal over the entire display. One or more third image signal group attributes for each of the plurality of pixel groups are formed 115, and the third group attributes and the stored first group attributes are compared 120 to form 125 at least one new group difference value for each pixel group. The new group difference values are compared 130 to at least one second predetermined metric to form 135 at least one new pixel group dynamic value, the new group dynamic values are combined 140. If the combined new group dynamic values are found 145 to be greater than a second limit, the third image signal group attributes are stored 105 and subsequent image signal is displayed 110.

According to the present invention, the display-preserving signal is an image signal displayed on the display that preserves the lifetime of the display, reduces the power used by the display, or preserves the lifetime or reduces the power used by the system of which the display is a part. For example, a display-preserving image signal may be a dark signal (i.e. a black image), a scene or graphic that changes over time, a darkened second image signal, or an image signal wherein every pixel changes over time. A dark signal both reduces the power used by a display and improves the lifetime of the display. Similarly, a darkened image signal (i.e. an image signal that presents a scene but at a reduced luminance) will both reduce the power used by a display and improve the lifetime of the display. A scene or graphic that changes over time can reduce the burn-in of a display as can an image signal wherein every pixel changes over time.

In yet a further embodiment of the present invention, the first and subsequent second image signals are separated in time by a prescribed time difference, intermediate image signals are displayed between the first and second images, combined group dynamic values for each intermediate image signal relative to the first image signal are formed, and wherein the display-preserving image signal is displayed only when the combined group dynamic values are found to be less than the first limit for all of the intermediate images. The prescribed time difference may be user-definable and the prescribed time difference may depend on characteristics of the image signals, such as the average or peak pixel luminance of the first image signal. In this way, a sequence of static images must be received before the display-preserving image signal is employed. Such an embodiment can be useful if, for example, an image sequence broadcast is temporarily interrupted.

In an alternative embodiment of the present invention, one or more intermediate image signals are received between the second and third image signals, combined group dynamic values for each intermediate image signal relative to the first image signal are formed, and the third image signal is displayed only when the combined group dynamic values are found to be greater than the second limit for at least one intermediate image signal and the third image signal. In this embodiment, a sequence of static images may be interrupted with one or more different images while continuing to cause the display-preserving image signal. Such an embodiment can be useful if, for example, a relatively static image sequence broadcast is interrupted with noisy frames, for example flicker, and it would be desired to maintain a display-preserving image signal.

In alternative embodiments of the present invention, the limits employed to make judgments on the dynamism of comparative image signals may be different. For example, it may be desired to employ a relatively strict standard to determine that two images are mostly the same while a less strict standard is employed to determine that two images differ. In this way, a more rigorous standard may be employed to begin using the display-preserving image signal than to cease using it. Moreover, the first and/or second limits may be dependent on the characteristics of the first, second, or third image signals so that the limits may be adjusted to compensate for a variety of signal types.

Figure 2:
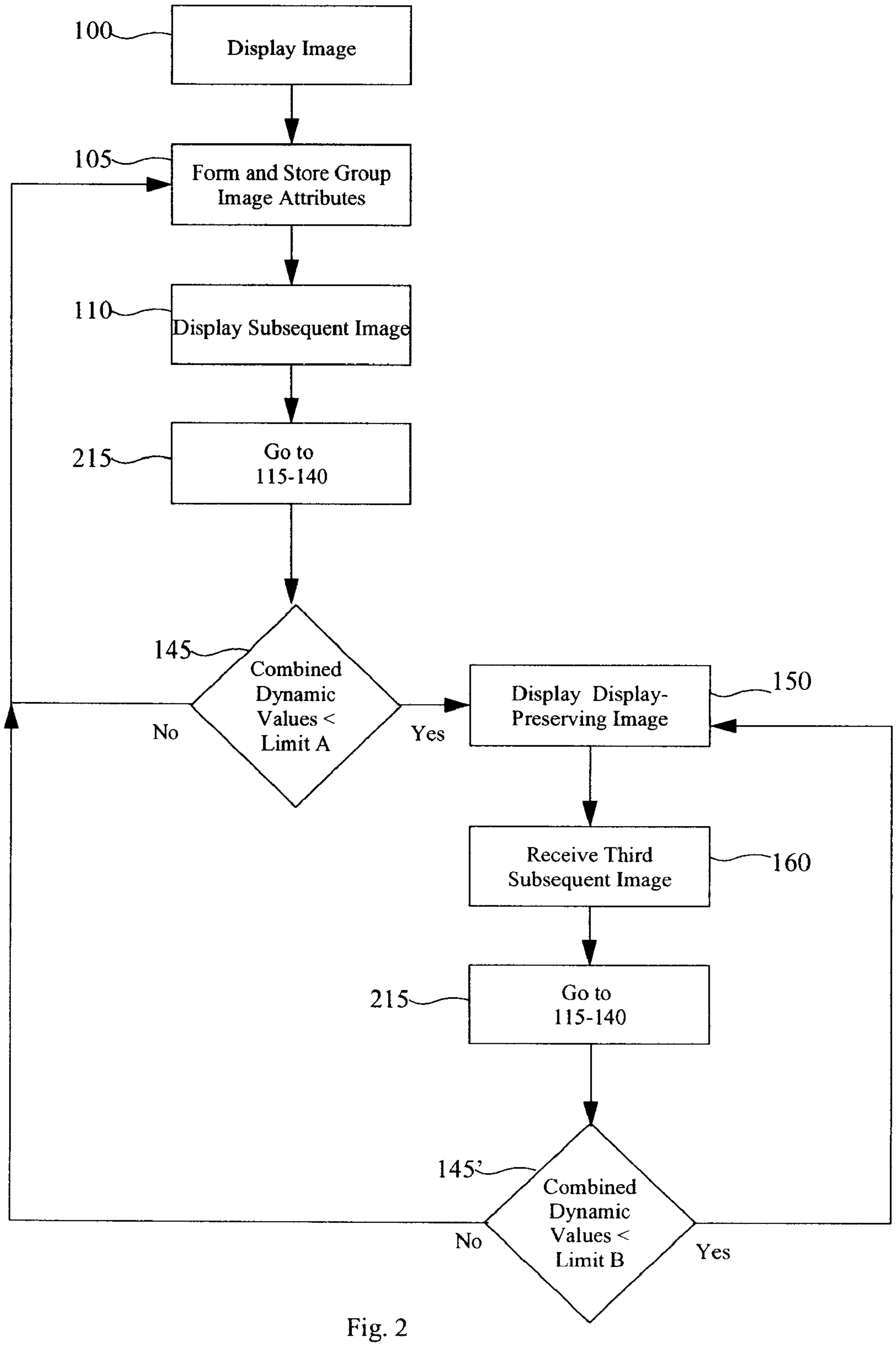
FIG. 2 is a flow diagram of the method according to another embodiment of the present invention.

Referring to FIG. 2, an initial image is displayed 100 and the group image attributes formed and stored 105. A subsequent image is received and displayed 110 and processed 215 using the steps 115-140 of FIG. 1. At the conclusion of step 140, the combined group dynamic value is tested 145 and, if the combined group dynamic value is less than a first limit A, the display-preserving image signal is displayed 150. If not, the group image attributes of the subsequent image are stored and the process repeats with a new subsequent image until the combined group dynamic value is less than the limit A. Third subsequent images are then received and processed 215 using the steps 115-140 of FIG. 1. At the conclusion of step 140, the combined group dynamic value is tested 145' and if the combined group dynamic value is less than a second limit B, the display-preserving image signal is displayed 150 and the process repeats using limit B to judge whether or not to continue displaying the display-preserving image signal. If not, the group attributes are stored 105, subsequent images displayed 110, and the entire process begins again.

In various embodiments of the present invention, the image signals may be high-definition television format signals or standard definition television format signals. Conventional broadcast television signals are analog while some modern televisions employ a digital signal distributed, for example, by cable. The present invention may be employed in both modalities. Analog signals may be digitized and attributes formed digitally or, by employing analog circuitry such as operational amplifiers, transistors, and capacitors, the attributes may be formed in the analog domain. Digital signals may be processed digitally and will not generally be transformed to the analog domain to form the group attributes.

Group attributes useful for detecting static digital image signals and the degree of image change in a pixel group may include one or more of the following: the result of a logical exclusive OR or logical exclusive NOR applied to the pixels in the group, an average value of the pixels in the group, a sum of the pixel values in the group, a multi-value reduced resolution array representing the pixels in the group, and the spatial location of the group in the image. In the analog signal domain, group attributes may include one or more of the following: an average of the pixel values in the group, a sum of the pixel values in the group, a multi-value reduced resolution array representing the pixels in the group, and the spatial location of the group in the image.

Generally, attributes that are formed by a logical combination of digital values (for example, an exclusive OR operation performed on the pixels in a group) will form a single value having two states that can be directly compared to the corresponding group attribute of another image signal. Any difference, however small, will indicate that a match is not made and there is no effective measure of the degree of difference. This can be a useful attribute but tends not to be robust when used alone, since any minor noise or error in the system will indicate that a match is not present. Computations providing an average value or sum of pixel elements are much more robust in the presence of noise, but can on the contrary produce a false positive comparison since two different pixel groups may have very different content and yet produce a similar average or sum. A more complex attribute may be formed by a reduced resolution version of a pixel group. Such a multi-value attribute may be, for example, correlated with a corresponding and similar pixel group from another image signal to provide a much more sophisticated measure of difference. An extremely useful group attribute indicates the location of the pixel group within the two-dimensional array of the image signal.

In a preferred embodiment of the present invention, a plurality of attributes describing the similarity between two pixel groups may be employed. These attributes may be compared to each other to form a group difference value (either logical or computational). The group difference value may be compared to a predetermined metric, for example a threshold value, to provide a group dynamic value that represents the likelihood or extent of pixel group similarity. At this point, each pixel group will have a local group dynamic value (either logical or computational) indicative of differences between the corresponding pixel groups in two different images. The group dynamic values may then be combined to form a combined group dynamic value representative of the overall likelihood and extent of image signal similarity. The group dynamic value may be compared to a predetermined metric to make a judgment whether to employ, or cease employing, a display-preserving signal.

In one embodiment of the present invention, the pixel group attributes or group difference values may be computational, for example a difference of sums or a correlation of a multi-value reduced resolution array for the corresponding pixel groups. These group difference values may be compared to a predetermined metric to obtain a logical group dynamic value for each group. A quantitative measure comprising a count of the group dynamic logical values that exceeded the metric compared to those that did not may be employed to form the combined group dynamic value and compared to a predetermined metric threshold value to make the judgment whether to employ, or cease employing, a display-preserving signal.

In a preferred embodiment of the present invention, the combination of group dynamic values may be weighted by the spatial location of the pixel groups within the two-dimensional image signal. (Alternatively, the calculation of the group difference value may be so weighted.) For example, it is likely that minor changes in an otherwise static image, for example time indicators (digital or analog clocks) will be located in a corner of an image, stock tickers may be located on the bottom or top of an image, as will sports scores, weather updates, or minor changes in web pages. Such changes may be present in image signals when the image signals may still be desired to be considered static for a particular application. Hence by weighting the dynamism of a pixel group that is not at the edge of an image signal, a more acceptable decision may be made.

Figure 3:
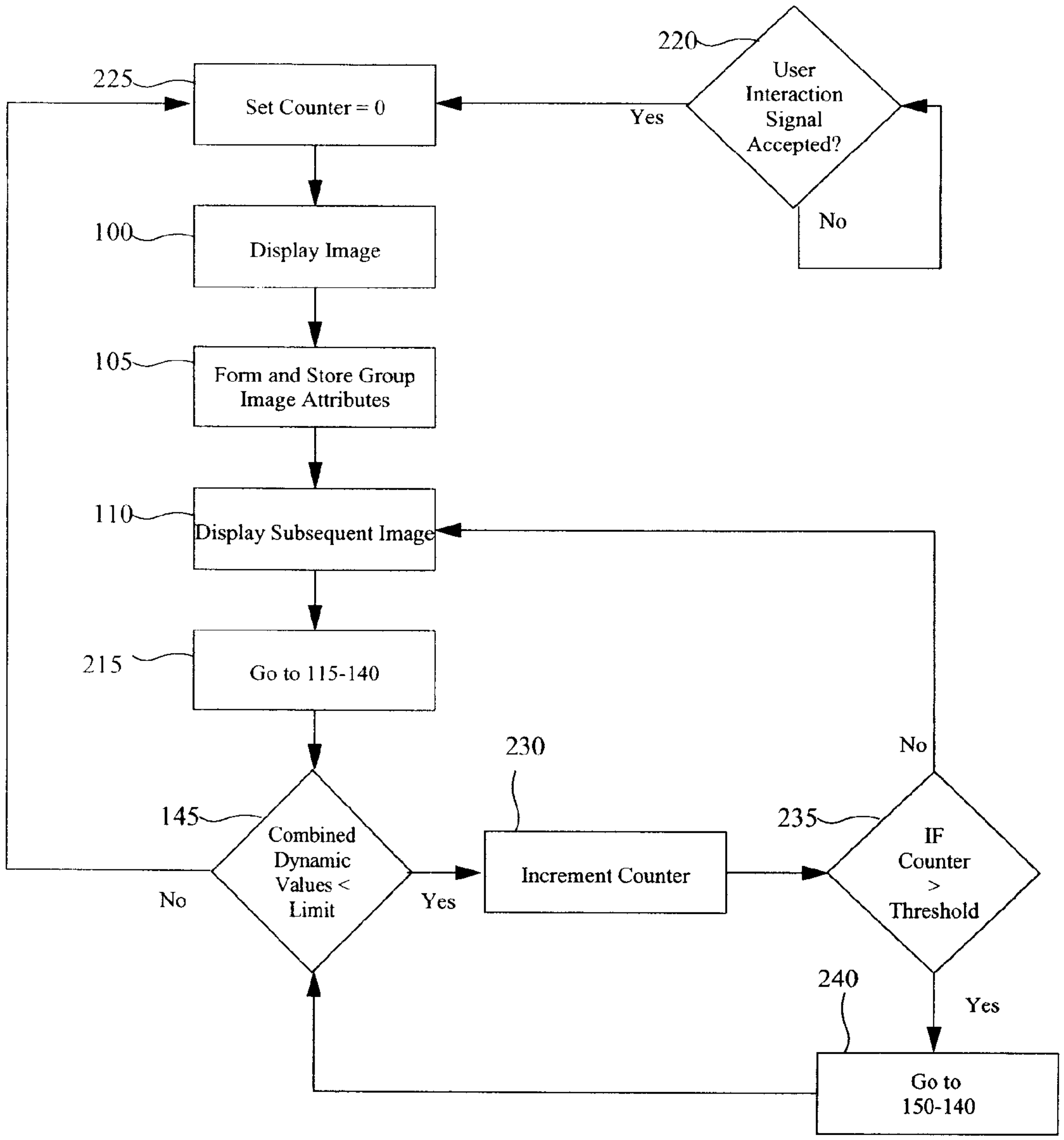
FIG. 3 is a flow diagram of the method according to yet another embodiment of the present invention.

In one embodiment of the present invention, it is preferred that image signals are provided in a continuous sequence of image signals and that a certain number of consecutive image signals must all be judged static before the display-preserving image signal is employed. In this case, the first and subsequent second image signals are separated in time by a prescribed time difference, intermediate image signals are displayed between the first and second images, combined group dynamic values for each intermediate image signal relative to the first image signal are formed, and the display-preserving image signal is displayed only when the combined group dynamic values are found to be less than the first limit for all of the intermediate images. Hence, not only must a time period elapse (or, equivalently, a number of periodic image signals received and displayed) before employing the display-preserving signal, but all of the image signals received during that time period must be similarly judged to be static image signals. Referring to FIG. 3, a counter is set 225 to zero and the first image displayed 100 and the group image attributes formed and stored 105. A subsequent image is displayed 110 and the process for detecting static images as described above then proceeds 215 using the steps 115-140 of FIG. 1. The combined group dynamic value is tested 145, and if the combined group dynamic values are less than the limit (i.e. a static image signal is detected), the counter is incremented 230 and compared 235 to a threshold count. If the threshold is reached (i.e. enough consecutive image signals have been judged to be static), the process moves 240 to the display-preserving mode using the steps 150-140 of FIG. 1. If the threshold count is not reached, the subsequent image signal is received and displayed 110 and the process continues as before from that step. If the combined group dynamic values are not less than the limit (i.e. a different image signal is detected), the counter is set 225 to zero and the process restarts.

In alternative embodiments of the present invention and as illustrated in FIG. 3, a user-interaction signal may be accepted 220 to interrupt the display of the display-preserving signal. If this occurs, the counter may be reset 225, a new image signal may be displayed 100, and the process as described above followed thereafter. Such an embodiment may be useful to users who wish to observe the incoming image signals.

Figure 4:
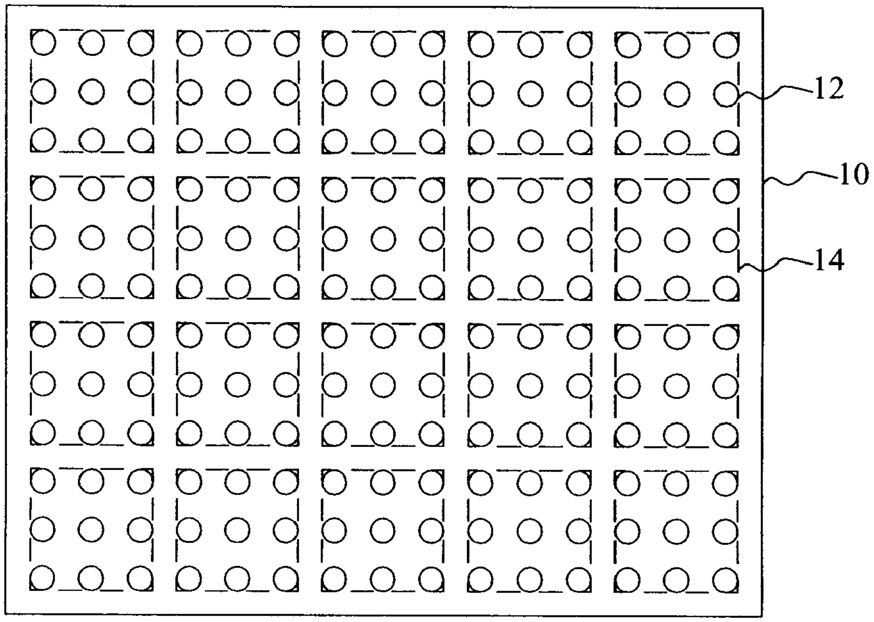
FIG. 4 is a schematic diagram illustrating pixel groups in an image signal according to an embodiment of the present invention.
Figure 5:
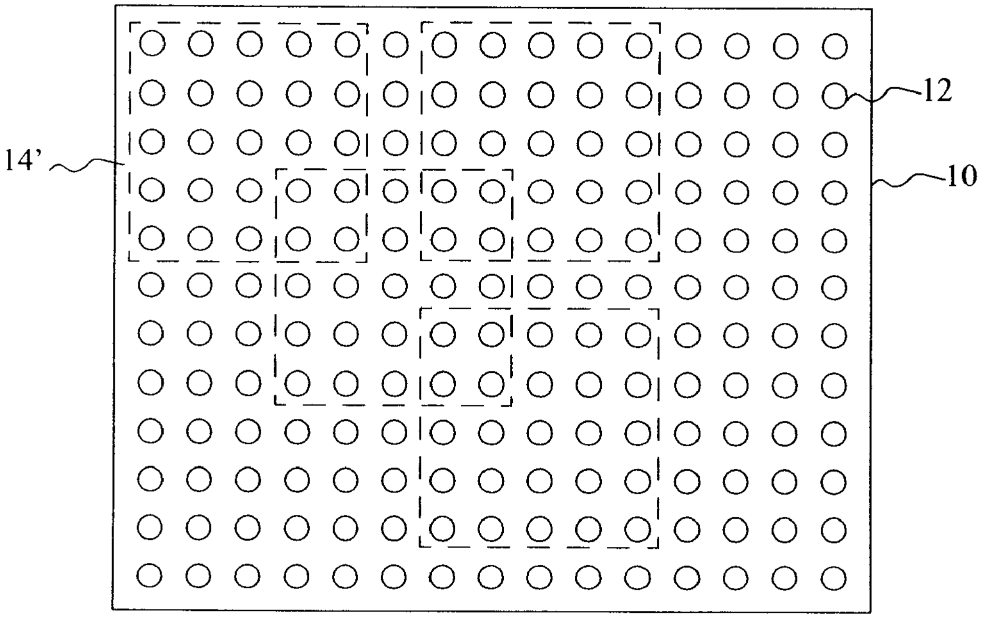
FIG. 5 is a schematic diagram illustrating overlapped pixel groups in an image signal according to an embodiment of the present invention.

Referring to FIG. 4, a two dimensional depiction of an image signal 10 includes pixels 12 organized in non-overlapping pixel groups 14. In this example the pixel groups are three-by three arrays. In an alternative embodiment of the present invention shown in FIG. 5, the pixel groups 14' may overlap each other so that some pixels may be found in only one group but at least one pixel is found in at least two groups. In the alternative example, for clarity only a few of the overlapped groups are shown. By overlapping the groups, attributes with more accurate values may be made, particularly for measure employing correlations.

Figure 6:
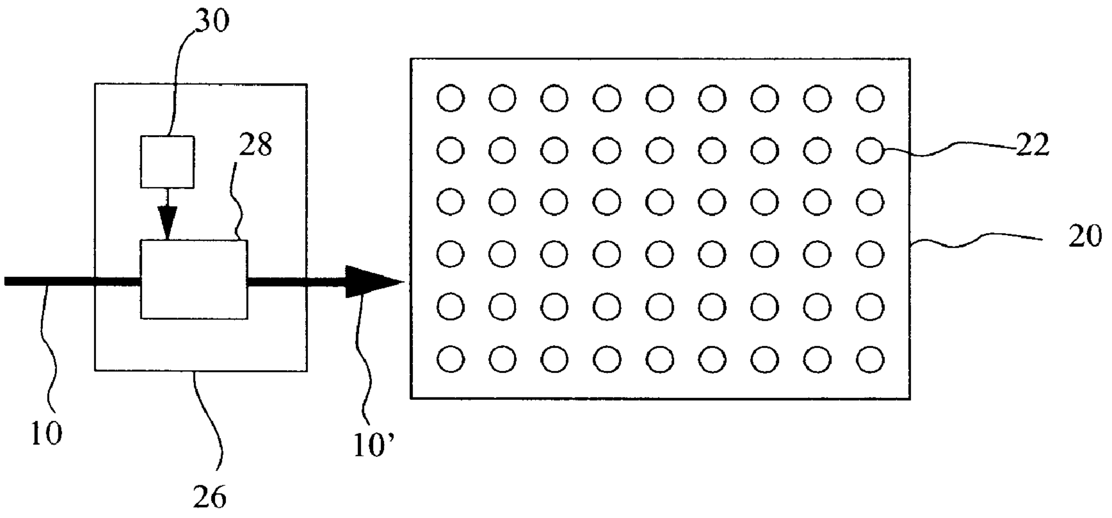
FIG. 6 is a schematic diagram of a system for implementing the method of the present invention.

Referring to FIG. 6, a system enabling the method of the present invention may comprise a display 20 having light-emitting elements 22 arranged in a two-dimensional array corresponding to the pixels of the image signals. A controller 26 may receive an image signal 10 and perform the method of the present invention using digital logic 28, with or without volatile or non-volatile memory 30. If analog input is employed, an analog to digital converter, not shown, may be used to convert the image signal to a form suitable for processing. The controller 26 may also convert the image signal 10 into a form 10' suitable for driving the display 20 (for example by providing appropriate voltage levels and timing signals). Digital and analog circuitry are known in the art for performing such operations for example with display controller chips, digital logic circuits, and digital signal processors.

The present invention can provide useful means to detect static image signals and provide display-preserving signals suitable for improving display lifetime and reducing power usage. By employing attributes of pixel groups rather than entire images for comparison, storage is reduced. In the case of analog signals that have corrupted sync signals or errors in digitization, ghosting, or digital signals that have blocking or decompression errors, the use of correlation and average or sums of pixel group attributes can provide a robust measure of change. Similarly, otherwise effectively static image sequences that exhibit camera shake (slight variations in scene positions) may be judged suitably static by employing similar attributes. Frame interruption may be suitably ignored by requiring a series of consecutive frames to be judged similarly. In the case in which scenes have one small area that changes but are otherwise static, by weighting the areas that are likely to have the changes lower, a scene may be properly judged to be effectively static. Interrupted broadcast signals may be suitably dealt with, either for dropped frames or for incorrect inserted frames causing flicker.

In a preferred embodiment of the present invention, the display is an OLED display and the invention is employed in a device that includes Organic Light-emitting Diodes (OLEDS) which are composed of small molecule or polymeric OLEDs as disclosed in but not limited to U.S. Pat. No. 4,769,292, issued Sep. 6, 1988 to Tang et al., and U.S. Pat. No. 5,061,569, issued Oct. 29, 1991 to VanSlyke et al. Many combinations and variations of organic light-emitting displays can be used to fabricate such a device. In other embodiments, the present invention is employed in plasma display devices.

The present invention can be employed in most OLED device configurations. These include very simple structures comprising a single anode and cathode to more complex devices, such as passive-matrix displays comprised of orthogonal arrays of anodes and cathodes to form light-emitting elements, and active-matrix displays where each light-emitting element is controlled independently, for example, with thin film transistors (TFTs). It may be employed in both top- and bottom-emitter configurations.

The invention has been described in detail with particular reference to certain preferred embodiments thereof, but it will be understood that variations and modifications can be effected within the spirit and scope of the invention.

PARTS LIST

10 image signal
12 pixel
14 pixel group
14' overlapped pixel group
20 display
22 light-emitting element
26 controller
28 digital circuitry
30 memory
100 display image signal step
105 form and store group image attributes step
110 display image signal step
115 form group image attributes step
120 compare group image attributes step
125 form group difference values step
130 compare group difference values step
135 form group dynamic values step
140 combine group dynamic values step
145, 145' test combined group dynamic values step
150 display display-preserving image signal step
160 receive third image step
215 perform steps 115-140 step
220 test user interaction signal step
225 set counter to zero step
230 increment counter step
235 test counter step
240 perform steps 150-140 step

The invention claimed is:

1. A method of driving a display having a plurality of light-emitting elements that change with time or use, comprising the steps of:

a) displaying a first image signal having spatially distributed pixels divided into a plurality of groups, each pixel group comprising more than one spatially neighboring pixel, and forming and storing one or more first image signal group attributes for each of the plurality of pixel groups;

b) displaying a subsequent second image signal having spatially distributed pixels divided into the plurality of groups and forming one or more subsequent second image signal group attributes for each of the plurality of pixel groups; and c) comparing the subsequent second group attributes and the stored first group attributes to form at least one group difference value for each pixel group, comparing the group difference values to at least one predetermined metric to form at least one pixel group dynamic value, combining the group dynamic values, and if the combined group dynamic values are found to be less than a first limit, displaying a display-preserving image signal over the entire display that is different from the first and second image signals, and if the combined group dynamic values are not found to be less than a first limit, storing the subsequent second image signal group attributes.

2. The method of claim 1, further comprising d) receiving a subsequent third image signal having spatially distributed pixels divided into the plurality of groups while displaying the display-preserving image signal over the entire display, and forming one or more subsequent third image signal group attributes for each of the plurality of pixel groups; and e) comparing the subsequent third group attributes and the stored first group attributes to form at least one new group difference value for each pixel group, comparing the new group difference values to at least one second predetermined metric to form at least one new pixel group dynamic value, combining the new group dynamic values, and if the combined new group dynamic values are found to be greater than a second limit, displaying the third image signal and storing the subsequent third image signal group attributes.

3. The method of claim 2, wherein one or more intermediate image signals are received between the second and third image signals, combined group dynamic values for each intermediate image signal relative to the first image signal are formed, and wherein the third image signal is displayed only when the combined group dynamic values are found to be greater than the second limit for at least one intermediate image signal and the third image signal.

4. The method of claim 1, wherein the first and subsequent second image signals are separated in time by a prescribed time difference, intermediate image signals are displayed between the first and second images, combined group dynamic values for each intermediate image signal relative to the first image signal are formed, and wherein the display-preserving image signal is displayed only when the combined group dynamic values are found to be less than the first limit for all of the intermediate images.

5. The method of claim 4, wherein the prescribed time difference is user-definable.

6. The method of claim 4, wherein the prescribed time difference depends on the luminance of the first image signal.

7. The method of claim 1, further comprising the step of accepting a user-interaction signal, displaying a new first image signal, and forming and storing one or more new first image signal group attributes for each of the plurality of pixel groups.

8. The method of claim 1, wherein any of the image signals are high-definition television or standard definition television format signals.

9. The method of claim 1, wherein the image signal is a digital signal and the group attributes include one or more of the following: a logical exclusive OR or logical exclusive NOR of the pixels in the group, an average value of the pixels in the group, a sum of the pixel values in the group, a multi-value reduced resolution array representing the pixels in the group, and the spatial location of the group in the image.

10. The method of claim 1, wherein the image signal is an analog signal and the group attributes include one or more of the following: an average of the pixel values in the group, a sum of the pixel values in the group, a multi-value reduced resolution array representing the pixels in the group, and the spatial location of the group in the image.

11. The method of claim 1, wherein the group attributes include a multi-value reduced resolution array representing the pixels in the group, and the group difference value is a correlation of the multi-value reduced resolution array.

12. The method of claim 1, wherein the pixel groups are a two-dimensional array of non-overlapping pixels that includes all pixels in the image signal.

13. The method of claim 1, wherein the pixel groups are a two-dimensional array of partially-overlapping pixels that includes all pixels in the image signal at least once and some at least twice.

14. The method of claim 1, wherein each of the group difference values and group dynamic values are quantitative values or logical values.

15. The method of claim 14, wherein the group dynamic values are logical values, and the combined group dynamic values are a quantitative measure of logical values.

16. The method of claim 1, wherein the group dynamic values are weighted by the corresponding group spatial location.

17. The method of claim 2, wherein the first and second limits are different.

18. The method of claim 2, wherein either the first and/or second limits are dependent on the characteristics of the first, second, or third image signals.

19. The method of claim 1, wherein the display-preserving image signal is a dark signal, a scene or graphic that changes over time, a darkened second image signal, or an image signal wherein every pixel changes over time.

20. The method of claim 1, wherein the display is an OLED display.

* * * * *